United States Patent [19]  
Dehm

[11] 3,716,604  
[45] Feb. 13, 1973

[54] METHOD FOR BONDING SOLID PROPELLANTS TO ROCKET MOTOR CASING

[75] Inventor: Henry C. Dehm, Salt Lake City, Utah

[73] Assignee: Hercules Incorporated, Wilmington, Del.

[22] Filed: May 2, 1967

[21] Appl. No.: 637,037

[52] U.S. Cl..................264/3 R, 102/103, 149/94; 95
[51] Int. Cl. .............................................C06b 21/02
[58] Field of Search.......................149/109, 96–100, 149/94, 95; 264/3; 102/103

[56] References Cited

UNITED STATES PATENTS

| | | | |
|---|---|---|---|
| 2,877,504 | 3/1959 | Fox | 264/3 |
| 2,985,055 | 5/1961 | McMichael | 264/3 X |
| 3,021,748 | 2/1962 | Miller | 264/3 X |
| 3,213,173 | 10/1965 | Cobb | 264/3 X |
| 3,215,028 | 11/1965 | Pitchford et al. | 102/103 X |
| 3,250,829 | 5/1966 | Wall | 102/103 X |
| 3,381,614 | 5/1968 | Ratz et al. | 149/109 X |

*Primary Examiner*—Carl D. Quarforth
*Assistant Examiner*—Stephen J. Lechert, Jr.
*Attorney*—Michael B. Keehan

[57] ABSTRACT

The reliability of propellant-case bond adhesion is improved by chemically bonding the propellant binder to the insulator of the rocket motor casing during the propellant cure cycle. Bonding is effected by treating a surface of an uncured elastomeric insulator with a polyfunctional material such as unsaturated alcohols, acids, amines, or isocyanates, curing the insulator, placing uncured propellant against the treated surface, and then curing the propellant in place. Excellent adhesion of nitrocellulose-containing propellants to butadiene-styrene type insulators is demonstrated using undecylenic alcohol as the surface treating material.

4 Claims, No Drawings

METHOD FOR BONDING SOLID PROPELLANTS TO ROCKET MOTOR CASING

This invention relates to bonding solid propellants to the lining of rocket motor cases and, more particularly, to an improved method for chemically bonding solid propellants to an elastomeric insulator material.

In the propellant field and, more particularly, in solid rocketry, it is oftentimes necessary to bond the propellant grain to an insulator, as, for example, to the elastomeric lining of a motor case. Unless the propellant grain is securely held in the motor case throughout motor firing, nozzle blockage, unpredictable variations in burning surface, overpressure, and even case rupture can occur. It is therefore necessary to maintain between the propellant and the internal insulation a bond which has sufficient strength to prevent propellant separation during handling, storage, and firing of the motor.

The major problem in obtaining good adhesion between the propellant and the insulator concerns the bonding of the dissimilar materials used in the propellant grain and the insulator. Various materials and systems have been used to achieve this bonding. For example, in one system the propellant is held in place by nylon "loops" attached to the insulator surface, and in another system "fingers" of propellant are embedded in a thick film of epoxy resin applied to the insulator surface. Although these systems provide a reasonable degree of adhesion, the propellant and insulator bond is still susceptible to rupture due to its mechanical nature and additionally, in some cases, due to softening of the epoxy resin by the propellant plasticizer. Moreover, because such systems are extremely complex, implementation is involved, time consuming, and expensive. Therefore, there is a great need for a simple, inexpensive, and reliable method for bonding a solid propellant to an insulator surface.

Now, in accordance with the present invention, it has been found that the reliability of the bonding can be increased and hence the possibility of motor failure due to propellant-case bond separation significantly reduced by chemically bonding the insulator surface to the polymeric binder of the propellant during the normal cycle for curing the propellant. More specifically, the present invention relates to chemically bonding a solid propellant to the elastomeric insulator of a rocket motor casing which comprises (a) treating a surface of an uncured elastomeric insulator with a polyfunctional material containing at least one functional group chemically reactive with the elastomer during cure of the elastomer and at least one other functional group chemically reactive with the propellant binder during cure of the propellant; (b) curing the insulator; (c) placing uncured propellant against the treated insulator surface; and (d) curing the propellant in place.

Elastomeric materials which can be utilized as the rocket casing insulator in accordance with this invention are any of the well-known vulcanizable elastomers or rubbers. Particularly preferred are the styrene--butadiene rubbers, polybutadiene, poly(2,3-dimethylbutadiene), natural rubber, and the like, which can, if desired, contain such conventional filler materials as silica, carbon black, boric acid, asbestos, and the like.

Any propellant formulation which can be cured to give a solid rocket propellant is suitable for use in the invention. Particularly preferred are the nitrocellulose-containing propellants, as, for example, the older and well-known double base type as well as the modern high energy composite modified double base propellants that contain solid oxidizers and metal fuels. Non-nitrocellulose propellants employing such binders as cross-linked carboxy-terminated polybutadiene, polyisobutylene, butadiene-acrylic acid copolymer or butadiene-acrylic acid-acrylonitrile terpolymer, polyurethanes (isocyanate cross-linked long-chain diols), and the like can also be utilized in the process of the invention.

As stated above, a surface of the uncured insulator is treated with a polyfunctional material which contains groups which are
1. chemically reactive with the elastomer during curing of the elastomer, and
2. chemically reactive with the propellant binder during curing of the propellant.

Typical functional groups which chemically bond to elastomers during curing or vulcanization of the elastomer comprise allyl, hydroperoxy, mercapto, thiomercapto, thiuram, thioureido, thiazoyl, guanidino, mercaptothiazolyl, dithiocarbamyl, trithiocarbamyl, thiocarboxy, carbamyl, and like groups. Suitable functional groups which chemically bond with the propellant binder during propellant cure will vary, of course, depending upon the particular polymer employed as the propellant binder. When nitrocellulose is the binder polymer, isocyanate groups are particularly useful since they react directly with the hydroxyl groups of the nitrocellulose chain to give urethane linkages. Other groups such as hydroxyl, mercapto, primary or secondary amino and carboxyl groups which require the presence of cross-linking agents bearing isocyanate, epoxide, imine, and like functional groups during cure, are also suitable. Where the binder polymer is derived from a carboxy-terminated prepolymer and a cross-linking agent, the functional group can be primary or secondary amino, carboxyl, epoxy, or aziridino and is ideally primary amino or carboxyl, and when the binder polymer is a polyurethane, the functional group can be hydroxyl, primary, or secondary amino, isocyanate, etc. Exemplary of polyfunctional materials which meet the above requirements and are particularly useful in the process of the invention include the allylically unsaturated alcohols, amines, carboxylic acids and isocyanates such as undecylenic alcohol, undecylenic amine, undecylenic acid, undecylenic isocyanate, crotonic alcohol, crotonic amine, crotonic acid, crotonic isocyanate, oleic alcohol, oleic amine, oleic acid, oleic isocyanate, linoleic alcohol, linoleic amine, linoleic acid, linoleic isocyanate, and the like.

In the method of the present invention, the surface of the uncured insulator is treated with the polyfunctional material as such or as a solution in a volatile solvent using any of the known techniques for applying a coating of a solid or liquid to the surface of another material, as by brushing, spraying, and the like, and the treated insulator cured by vulcanizing, as, for example, by heating at 145° to 325°F. under pressures up to 45 p.s.i. for 1 to 2 hours. The propellant is then placed against the treated surface, as by casting if the propellant is, for example, a slurry of nitrocellulose fuel and oxidizer in a plasticizer and the propellant cured, preferably at from 120° to 140°F. for 5 to 12 days.

The following examples further illustrate, but are not means to limit, the invention. All parts and percentages therein are by weight unless otherwise indicated. In these examples the insulator was 4.5 × 8 × 0.06 inch sheets of uncured silica-filled styrene--butadiene rubber stock, and the propellant formulation was a homogeneous slurry containing 7.0 percent nitrocellulose, 25.0 percent nitroglycerin, 18.0 percent aluminum powder, 45.0 percent cyclotetramethylenetetranitramine (180μ particle size), 4.0 percent polyethyleneglycol adipate-tolylene diisocyanate cross-linker, 1.0 percent 2-nitrodiphenylamine stabilizer, and 0.005 percent dibutyl tindiacetate catalyst.

EXAMPLE 1

One surface of the insulator sheet stock was brush-coated with undecylenic alcohol to give a 1–2 mil coating and the coated stock sealed in an aluminum envelope and vulcanized immediately in a heated plate press for 90 minutes at 325°F. and 45 p.s.i. pressure. After vulcanization, the cured stock was removed from the envelope, washed with methanol to remove any unreacted undecylenic alcohol, and then dried at 212°F. for 1 hour. The propellant slurry was cast against the treated surface of the cured stock in a peel test mold and cured in order to evaluate the adhesion of the insulator surface to the propellant using a 90° peel test. In this test the cured rubber was placed in a three-piece mold with the treated side up and the mold filled to a depth of 0.5 inch with the propellant slurry. The mold was then sealed in a polyethylene bag and the bag containing the mold heated in a 120°F. oven for 12 days, after which time it was cooled to room temperature and disassembled. The propellant surface of the molded insulator-propellant slab was then bonded to a one-fourth inch plywood sheet and the insulator surface bonded to fiberglass cloth with an epoxide adhesive, thus giving a plywood-propellant-insulator-glass cloth sandwich. Inch-wide parallel cuts were then made lengthwise through the fiberglass-coated insulator to give 1 inch test strips which were peeled through a 90° angle at 75°F. and a crosshead speed of 2 inches per minute on an Instron tensile tester. The peel test samples failed 100 percent in the propellant whereas test samples of a control, processed in the same manner except that the uncured insulator stock was not coated with the alcohol, failed 100 percent at the propellant-insulator interface.

EXAMPLE 2

The procedure of Example 1 was repeated except that in this example just before casting the propellant slurry against the treated surface of the cured insulator, an extra 25 mg. of dibutyl tindiacetate was applied as an acetone solution to each 200 sq. cm. of the treated insulator surface and the acetone permitted to evaporate at room temperature. The 90° peel test indicated 100 percent failure in the propellant.

EXAMPLE 3

The procedure of Example 1 was repeated except that in this example the cured insulator, after washing with methanol and drying, was coated with a 1-mil film of polymethylene polyphenylisocyanate applied by brushing. The 90° peel test indicated 100 percent failure in the propellant.

The above examples demonstrate that excellent adhesion between the insulator and the propellant can be obtained using the method of the present invention. Although the invention has been exemplified using a cross-linkable propellant formulation, the invention is not so limited and is applicable to either cross-linked or noncross-linked propellants. Likewise, the invention is not limited to propellants containing nitrocellulose as the binder polymer and is applicable to any propellant which cures via a chemical reaction, including those propellants containing polymeric binders derived from carboxylic acids such as polybutadiene dicarboxylic acid, polyisobutylene dicarboxylic acid, and the like, binders derived from long-chain diols, long-chain diamines, and the like, etc.

What I claim and desire to protect by Letters Patent is:

1. A method for chemically bonding a solid propellant to an elastomeric insulator for a rocket motor casing which comprises
   a. applying to a surface of an uncured elastomeric insulator a coating of a polyfunctional material containing at least one functional group chemically reactive with the elastomer during cure of the elastomer and at least one other functional group chemically reactive with the propellant binder during cure of the propellant,
   b. curing the insulator,
   c. placing an uncured propellant against the coated insulator surface, and
   d. curing the propellant in place.

2. The method of claim 1 wherein the elastomeric insulator is butadiene--styrene rubber and the propellant is a nitrocellulose-containing propellant.

3. The method of claim 2 wherein the polyfunctional material is undecylenic alcohol.

4. The method of claim 3 wherein the nitrocellulose propellant is a slurry which is cast against the coated insulator surface and curing of the propellant is carried out in the presence of a polyisocyanate and a curing catalyst.

* * * * *